UNITED STATES PATENT OFFICE 2,590,997

METHOD FOR SEPARATING COLLOIDALLY DISPERSED IRON PARTICLES FROM ORGANIC LIQUIDS

Edward Mitchell, Pittsburgh, Pa., assignor to Gulf Research & Development Company, Pittsburgh, Pa., a corporation of Delaware No Drawing. Application August 1, 1949, Serial No. 108,052

12 Claims. (Cl. 252—326)

This invention relates to a method for separating colloidal iron particles from organic liquids and more particularly to a method for coagulating collodial iron particles dispersed in an organic liquid medium.

It is frequently desirable to purify organic liquids by the removal of colloidal iron dispersed in the liquid. This is especially true in the case of organic liquids which are products of chemical reactions employing an iron catalyst. During such reactions and especially when the iron catalyst is employed in a finely divided form the iron or a portion thereof is reduced to colloidal dimensions. A possible explanation for the production of colloidal iron is the formation of an iron salt during reaction which is subsequently decomposed to produce colloidal iron. This colloidal iron, because of its small particle size, cannot in most instances be removed from the product by ordinary separation methods such as by filtering or centrifuging. Attempts have been made to coagulate the colloidal iron by adding substances such as acetic acid, butyric acid, or heptylic acid to the impure product. At least partial coagulation of the colloid may thus be achieved but the rate of coagulation is extremely slow for commercial processes usually requiring contacting over a period of several days. Also vigorous centrifuging and the use of filter aids is frequently necessary in the removal of colloidal iron when these prior art substances are used as coagulants.

This invention has as an object to provide a method for separating colloidal suspensions of iron from organic liquids.

A further object is to provide a method for coagulating colloidal iron dispersed in organic liquids.

A still further object is to provide a method for coagulating colloidal iron dispersed in organic liquids which is simpler and more rapid than previously employed methods. Other objects will appear hereinafter.

These and other objects are accomplished by the following invention in which a low molecular weight, water soluble, aliphatic hydroxy carboxylic acid is added to an organic liquid containing a dispersed phase of colloidal iron to coagulate the colloidal iron.

In the following description and examples I have set forth several of the preferred embodiments of my invention but it is to be understood that they are given by way of illustration and not in limitation thereof.

In my process a low molecular weight, water soluble, aliphatic hydroxy carboxylic acid, and preferably an acid in which the hydroxyl group is in the alpha position as for example, lactic acid, tartaric acid, gluconic acid, or a hydroxy acid obtained by the oxidation of sugars is added to an impure organic liquid containing a dispersed phase of iron colloid. After thorough agitation the mixture is allowed to stand and coagulation and settling of the coagulate takes place. In most instances, within a few minutes after the addition of the hydroxy acid, such coagulation and settling to the bottom of the organic liquid takes place. The iron particles are then removed from the liquid by any suitable means such as filtering or decanting. It may be preferable in this process to add a diluent liquid to the organic liquid containing the iron particles prior to the addition of the hydroxy acid coagulant. This diluent is especially advantageous with heavy viscous organic liquids and serves to keep the mixture homogeneous. It may be any readily separable miscible organic liquid such as acetone, benzene, alcohol, methylethyl ketone, toluene, etc.

The following examples illustrate the superiority of my process over prior art procedure.

Example I

The preparation of high molecular weight ketones illustrates a suitable process for the practice of my invention. Diphenylheneicosanone was prepared by heating phenylundecylic acid at 300–600° F. in the presence of 10–40 mesh iron filings for several hours. During the coupling reaction which produced the ketone, most of the iron filings were reduced to colloidal dimensions and thus a product was obtained comprising the crude ketone with colloidal iron dispersed therein. A possible explanation for the formation of colloidal iron is that an iron salt is formed which is subsequently decomposed by heat to form ketone, water, carbon dioxide and colloidal iron. Because of the particle size the colloidal iron could not be removed from the ketone by ordinary filtration methods or by contacting at elevated temperatures (100–350° F.) with "Super Filtrol" or other absorbent agent and filtering.

Example II

A first portion of crude ketone prepared according to Example I was purified by a prior art method, i. e., the crude ketone-iron mixture was passed twice through a high-speed centrifuge where most of the iron was removed; after the second centrifuging about 10 per cent by volume of glacial acetic acid was added to the ketone-iron mixture and the mixture was allowed to stand overnight in unstoppered containers; after standing, a small amount of "Celite" filter aid was added to the ketone-acetic acid solution and the solution was filtered at atmospheric pressure to remove coagulated iron colloid. Acetic acid was removed from the ketone by water washing. The total time to purify about 3 gallons of the ketone reaction product by this prior art method was approximately 24 hours.

*Example III*

Another portion of the crude ketone-iron mixture prepared according to Example I was purified by the process of the present invention. The mixture was diluted with an equal volume of acetone. About 10 per cent by volume of an 80 per cent aqueous solution of DL-lactic acid was added to the diluted crude ketone-iron mixture. This mixture was thoroughly agitated and allowed to stand for a few minutes. Within about 15 minutes after addition of the DL-lactic acid the colloidal iron particles were coagulated and had settled to the bottom of the liquid. The iron particles were then removed by filtering through a Buchner type filter. Acetone and lactic acid were removed from the ketone by washing several times with water. The total time required to substantially purify about 3 gallons of the diphenylheneicosanone by this novel process was approximately 2 hours.

*Example IV*

Another portion of the crude ketone-iron mixture prepared according to Example I was purified by my process employing gluconic acid as a coagulant. The portion of crude diphenylheneicosanone containing colloidal iron was diluted with an equal volume of acetone. To the resulting mixture five per cent by volume of a 50% aqueous solution of gluconic acid was added. This mixture was shaken for a few minutes and then allowed to stand. Within less than 45 minutes settling of the iron particles was obtained and the iron was removed by filtering. Acetone and gluconic acid were removed from the ketone by water washing. The total time for substantial purification of about 3 gallons of the ketone was approximately 2½ hours.

The superiority of my invention over the prior art method is clearly shown in these examples. The prior art method of purification practiced in Example II is time consuming and cumbersome. The centrifuge must be freed of deposited iron several times during the course of separation. A small quantity of product which adheres to the iron particles is lost. About 24 hours is required to purify about 3 gallons of ketone-iron mixture as compared with a time of approximately 2 to 2½ hours for purifying the same quantity of the mixture by my new process. Moreover, where large quantities of ketone are treated, substantial equipment savings and additional product recovery can be effected by the practice of my invention.

Although my process has been specifically described in the purification of diphenylheneicosanone, it is also highly effective in purifying other organic liquids which contain an iron colloid dispersed therein. For example, other ketones which are prepared in a similar manner to diphenylheneicosanone such as dicetyl ketone, dilauryl ketone, and distearyl ketone may be purified by my process. In addition, liquids such as hydrocarbons which have been treated such as by reduction, dehydrogenation, cyclization and, in general, by heating at elevated temperatures in the presence of iron catalysts or even in iron vessels may be separated from colloidal iron particles contained therein by my process.

The particular portions and quantities recited in Examples III and IV are merely given by way of example and can be varied considerably without affecting the improvement in results. For example, the diluent added to the liquid to be purified may be employed in an amount up to several volumes of the impure mixture. In fact, the diluting step may be eliminated from the process, but if so, the hydroxy acid may become slightly less effective as a coagulant in the case of highly viscous liquids. If such liquids are not diluted, the settling rate is lowered and filtration becomes difficult.

The hydroxy acid may be employed in aqueous or non-aqueous solution. The concentration of the acid solution should be high enough to cause rapid coagulation and is preferably above about 50 per cent by weight. The amount of acid solution added to the colloid-containing liquid is preferably between about 5 and 20 volume per cent, although larger or smaller amounts may be used. My process operates very satisfactorily at room temperature but may also be employed at higher or lower temperatures. The lower limit for temperature is largely determined by the increased viscosity of the impure liquid which would increase the time of settling and make filtering more difficult while the upper limit for temperature is largely determined by the existence of convection currents which would interfere with settling.

What I claim is:

1. The process of coagulating a stable suspension of colloidal iron dispersed in an organic liquid which comprises adding a low molecular weight, water soluble, aliphatic α-hydroxy carboxylic acid to said organic liquid containing colloidal iron to coagulate the colloidal iron and separating the coagulated colloidal iron from the organic liquid, said water soluble aliphatic α-hydroxy carboxylic acid being added in an amount and a concentration sufficient to rapidly coagulate the colloidal iron and said organic liquid being non-reactive with respect to the colloidal iron and the low molecular weight, water soluble aliphatic α-hydroxy carboxylic acid.

2. The process of separating a stable suspension of colloidal iron from an organic liquid containing said colloidal iron which comprises adding a low molecular weight, water soluble, aliphatic α-hydroxy carboxylic acid solution having a concentration of above about 50 per cent by weight to the organic liquid in the amount of from about 5 to 20 volume per cent to coagulate said colloidal iron and separating the coagulated colloidal iron from the organic liquid, said organic liquid being non-reactive with respect to the colloidal iron and the low molecular weight, water soluble, aliphatic α-hydroxy carboxylic acid.

3. The process of separating a stable suspension of colloidal iron from an organic liquid containing said colloidal iron which comprises diluting said organic liquid with a miscible readily separable organic liquid diluent, adding a low molecular weight, water soluble, aliphatic α-hydroxy carboxylic acid solution having a concentration of above about 50 per cent by weight to the diluted organic liquid in the amount of from about 5 to 20 volume per cent to coagulate said colloidal iron, separating the coagulated colloidal iron from the organic liquid and separating the diluent from said organic liquid, said organic liquid and said organic liquid diluent being nonreactive with respect to the colloidal iron and the low molecular weight, water soluble, aliphatic α-hydroxy carboxylic acid.

4. The process of coagulating a stable suspension of colloidal iron dispersed in an organic liquid which comprises adding lactic acid to said organic liquid containing colloidal iron to coagulate the colloidal iron and separating the coagulated colloidal iron from the organic liquid, said lactic acid being added in an amount and a concentration sufficient to rapidly coagulate the colloidal iron and said organic liquid being nonreactive with respect to the colloidal iron and the lactic acid.

5. The process of separating a stable suspension of colloidal iron from an organic liquid containing said colloidal iron which comprises adding lactic acid solution having a concentration of above about 50 per cent by weight to the organic liquid in the amount of from about 5 to 20 volume per cent to coagulate said colloidal iron and separating the coagulated colloidal iron from the organic liquid, said organic liquid being nonreactive with respect to the colloidal iron and the lactic acid.

6. The process of separating a stable suspension of colloidal iron from an organic liquid containing said colloidal iron which comprises diluting said organic liquid with a miscible readily separable organic liquid diluent, adding lactic acid solution having a concentration of above about 50 per cent by weight to the diluted organic liquid in the amount of from about 5 to 20 volume per cent to coagulate said colloidal iron, separating the coagulated colloidal iron from the organic liquid and separating the diluent from said organic liquid, said organic liquid and said organic liquid diluent being nonreactive with respect to the colloidal iron and the lactic acid.

7. The process of coagulating a stable suspension of colloidal iron dispersed in an organic liquid which comprises adding tartaric acid to said organic liquid containing colloidal iron to coagulate the colloidal iron and separating the coagulated colloidal iron from the organic liquid, said tartaric acid being added in an amount and a concentration sufficient to rapidly coagulate the colloidal iron and said organic liquid being nonreactive with respect to the colloidal iron and the tartaric acid.

8. The process of coagulating a stable suspension of colloidal iron dispersed in an organic liquid which comprises adding gluconic acid to said organic liquid containing colloidal iron to coagulate the colloidal iron and separating the coagulated colloidal iron from the organic liquid, said gluconic acid being added in an amount and a concentration sufficient to rapidly coagulate the colloidal iron and said organic liquid being nonreactive with respect to the colloidal iron and the gluconic acid.

9. The process of coagulating colloidal iron dispersed in a high molecular weight liquid ketone which comprises adding a low molecular weight, water soluble, aliphatic α-hydroxy carboxylic acid to said ketone containing colloidal iron to coagulate the colloidal iron and separating the coagulated colloidal iron from the ketone, said water soluble aliphatic α-hydroxy carboxylic acid being added in an amount and a concentration sufficient to rapidly coagulate the colloidal iron.

10. The process of coagulating colloidal iron dispersed in a liquid ketone selected from the group consisting of diphenyl heneicosanone, dicetyl ketone, dilauryl ketone and distearyl ketone, which comprises adding a low molecular weight, water soluble, aliphatic α-hydroxy carboxylic acid to said ketone containing colloidal iron to coagulate the colloidal iron and separating the coagulated colloidal iron from the ketone, said water soluble aliphatic α-hydroxy carboxylic acid being added in an amount and a concentration sufficient to rapidly coagulate the colloidal iron.

11. The process of separating colloidal iron from a liquid ketone selected from the group consisting of diphenyl heneicosanone, dicetyl ketone, dilauryl ketone and distearyl ketone, which comprises adding a low molecular weight, water soluble α-hydroxy carboxylic acid solution having a concentration of above about 50 per cent by weight to said ketone in the amount of from about 5 to 20 volume per cent to coagulate said colloidal iron and separating the coagulated colloidal iron from said ketone.

12. The process of separating colloidal iron from the liquid ketone, diphenyl heneicosanone, which comprises adding lactic acid solution having a concentration of above about 50 per cent by weight to the said ketone in the amount of from about 5 to 20 volume per cent to coagulate said colloidal iron, and separating the coagulated colloidal iron from said ketone.

EDWARD MITCHELL.

REFERENCES CITED

The following references are of record in the file of this patent:

UNITED STATES PATENTS

| Number | Name | Date |
| --- | --- | --- |
| 2,319,885 | Roberts | May 25, 1943 |